United States Patent [19]

Plumat et al.

[11] 3,887,348

[45] June 3, 1975

[54] GLASS COLORING PROCESS

[75] Inventors: Emile Plumat, Gilly; Jean Schottey, Montignies-sur-Sambre; Francois Toussaint, Montignies Le Tillful, all of Belgium

[73] Assignee: Glaverbel S.A., Watermael-Boitsfort, Belgium

[22] Filed: June 27, 1974

[21] Appl. No.: 485,843

Related U.S. Application Data

[63] Continuation of Ser. No. 293,032, Sept. 28, 1972, abandoned.

[30] Foreign Application Priority Data

Oct. 1, 1971 Luxembourg............................ 63992

[52] U.S. Cl..................................... 65/30; 65/99 A
[51] Int. Cl............................................. C03c 21/00
[58] Field of Search............................... 65/30, 99 A

[56] References Cited
UNITED STATES PATENTS

| | | | |
|---|---|---|---|
| 2,653,419 | 9/1953 | Brenner et al............................ | 65/30 |
| 3,420,698 | 1/1969 | Smith..................................... | 65/30 X |
| 3,425,816 | 2/1969 | Garfinkel................................ | 65/30 |
| 3,524,739 | 8/1970 | Loukes et al......................... | 65/30 X |
| 3,650,719 | 3/1972 | Laethem................................ | 65/30 |
| 3,650,720 | 3/1972 | Grego et al............................ | 65/30 |

Primary Examiner—Robert L. Lindsay, Jr.
Attorney, Agent, or Firm—Spencer & Kaye

[57] ABSTRACT

Bodies made of soda-lime-silica glass of ordinary composition and containing a small concentration of reducing ions at least in surface layers thereof and having no visible coloration are given a yellow coloration by diffusing a substance into such surface layers from a contacting medium which is composed of a mixture of metal salts containing between 0.01% and 3% by weight of a silver salt furnishing reducible silver metal ions capable of being reduced by the reducing ions in the glass in such a manner as to give the glass a yellow coloration. The diffusion step is conducted under concentration, temperature and time conditions which do not give a significant visible coloration to the glass. Subsequent to the diffusion, the glass bodies are heat-treated at a temperature above the strain point of the glass to develop a yellow coloration.

11 Claims, No Drawings

GLASS COLORING PROCESS

CROSS REFERENCE TO RELATED APPLICATION

This application is a continuation of Application Ser. No. 293,032, filed Sept. 28th, 1972 now abandoned.

BACKGROUND OF THE INVENTION

The present invention relates to a process for coloring or modification of the color of a glass body, particularly a body containing reducing ions, the process involving diffusion of a substance into the surface layers of the body from a contacting medium.

It is known to fabricate bodies of colored, or tinted, glass by forming them from a vitrifiable composition into which appropriate coloring, or tinting, agents have been incorporated. However, such a process can be performed in only a limited number of cases, due to the necessity of utilizing a different starting composition for each color to be produced. In the glass industry, particularly in the fabrication of flat glass, it is normally much more practical to color, or tint, the glass bodies during or after their formation so that the coloring treatment can be controlled independently of the composition of the vitrifiable mixture and of the process for producing the glass.

Various methods for coloring a body of glass during or after its fabrication are known. Such methods include covering the glass body with a film of metal or metal oxide, by vapor deposition.

It is possible to produce, by such a method a very thin film which only slightly reduces the light transmission of the body. However such a film is subject to deterioration or removal by abrasion or by some mechanical or chemical action.

A more satisfactory known process consists in causing coloring substances to diffuse into the glass at an elevated temperature. By this procedure, it is possible to tint the glass to a certain depth from its surface and the resulting tinting cannot be removed by simple scratching of the glass surface. However, such diffusion processes offer only limited application possibilities if it is desired to color a series of different glasses. For example, there exist numerous metals which can be diffused, in the form of ions, into a glass body and which impart different colorations to such a body. However, most of these metals, while being of potential value because of the particular color which they can impart to the glass, provide only a poor coloration when they are utilized according to known processes for coloring sheets of ordinary drawn glass. This is so at least when it is sought to carry out the treatment process in an economically acceptable manner.

Silver represents a particular example of a potentially valuable coloring metal. However, this metal imparts only a very poor yellow coloration to ordinary window glass which has been drawn in the form of a sheet when the silver is utilized as the coloring agent in diffusion coloring processes of the type heretofore employed, unless use is made of a large quantity of silver in the form of a salt in the treatment medium or the duration of the treatment is made relatively long. This poor yellow coloration is not sufficient to permit the resulting glass sheets to be used satisfactorily in the field of protection against actinic light.

SUMMARY OF THE INVENTION

It is an object of the present invention to eliminate the above-noted drawbacks and difficulties.

Another object of the invention is to substantially improve the coloration of glass by such diffusion processes.

A more specific object of the invention is to provide a diffusion type process having an increased degree of flexibility insofar as concerns the precise color and coloration density which can be imparted to a body constituted by a large variety of different glass compositions, including ordinary window glass.

These objects according to the invention are achieved in a process for coloring, or modifying the color of, a glass body containing reducing ions, the process being of the type which involves diffusing a substance into surface layers of the glass body from a contacting medium. According to the invention, the medium includes a mixture of metal salts composed of no more than 50 percent, by weight, of a salt furnishing reducible metal ions capable of being reduced by the reducing ions in such a manner as to color, or modify the coloration of, the body, and after the diffusion of reducible metal ions into the body from the medium, a final coloration is imparted to the body by heating it to a temperature above the strain point of the glass.

The process according to the invention has proven much more flexible than the known diffusion coloring processes in that the process according to the invention permits the attainment of a wide range of colorations for bodies composed of a wide variety of different glasses, and permits this to be achieved on an industrially profitable scale.

This result is due in great measure to the provision of two distinct treatment steps, i.e., a diffusion step in which the quantity of coloring substance available for diffusion into the glass body is restricted, and a development step during which the coloring substance which has diffused into the body produces the desired color or modifies the existing color of the body, or during which the coloring or color modification effect of this substance is developed.

In addition to the flexibility of the method according to the present invention, it provides the further significant advantage that the quantity of coloring agent necessary for obtaining a given coloration can be far smaller than the quantity necessary in previous processes.

During the first step of the process according to the invention, at least one part of the reducible ions diffusing into the glass body is reduced by the reducing ions present in the body. However, this reduction is not sufficient to produce the final coloration and in fact, in certain cases, at the end of the first treatment step the glass does not have any significant observable coloration. For example, when ordinary drawn glass sheets are treated in a treatment medium containing silver ions, the quantity of silver present in the treatment can be made very small and even insufficient for giving a visible coloration to the glass during the first step of the treatment. In this case, it is possible to carry out the process on an industrial scale in a very economical manner.

In the most important applications of the present invention, the treated body is constituted by soda lime glass of ordinary composition. Such glasses are substantially colorless and the practice of the present invention permits them to be given colorations which are determined solely by the coloring process.

The invention is also very useful for coloring soda lime flat glass as well as bodies constituted by such glass. The problem of coloring glass bodies in order to give them a perfectly controlled predetermined coloration and to satisfy specific optical requirements is often encountered in the fabrication of articles constituted by or made from soda lime flat glass. This is the case, for example, in the fabrication of flat or curved glazings, or even sunglass lenses.

The present invention can be applied with success, for example, in the coloration of soda lime flat glass formed by the float glass process, in which a layer of flat glass is supplied from a bath of molten glass and caused to float on a mass of higher density material. The invention can also be employed for coloring laminated soda lime glass.

According to other embodiments of the invention the process is employed for coloring a body composed of or formed from drawn soda lime flat glass, for example a panel of drawn flat glass or a panel of curved glass obtained by bending such a flat panel. The advantages presented by the invention are quite significant when it is employed for coloring such a body.

Drawn soda lime glass normally contains only a very small concentration of reducing ions, for example $Fe^{++}$, so that if it is attempted to color such a glass by means of certain substances in a diffusion process, it is not possible to give the glass a satisfactory coloration under industrially acceptable conditions. The resulting coloration is often too weak to obtain the desired objectives.

When the process according to the present invention is utilized, the result is a much more pronounced coloration obtained at a much lower cost. This is due to the fact that the special treatment performed in two steps permits the attainment of perfectly dense colorations while requiring a relatively low consumption of coloring substance and without involving a high consumption of heat energy. It has been found that it is possible to obtain a large range of coloration densities and a total treatment time of less than 24 hours, and even less than 5 hours, while employing a small quantity of coloring substance which, when it was utilized according to previous diffusion processes even in much larger quantities, only yielded a very poor coloration.

The utilization of a treatment medium containing not only a salt furnishing the reducible ions serving to produce the coloration, but also one or several other salts, is advantageous not only because the proportion of coloring substance available for diffusing into the glass is restricted, the maximum quantity of salt furnishing the reducible metal ions being, according to the invention, 50 percent, by weight, of the treatment medium, but also because the proportion, by weight, of such a salt can be varied within a wide range of values as a function of the specific results desired. In other words, the selection of this proportion furnishes a control parameter which is in addition to the control which can be obtained by adjustment of the temperature and duration of the treatment. For any given coloring substance, these parameters influence, at the same time, the depth of penetration of the reducible metal ions of the coloring substance and the final coloration.

In certain embodiments of the invention which take on a particular importance, the treatment medium contains less than 10%, by weight, of salt furnishing the reducible metal ions and such ions are entirely or in their major part silver ions. The utilization of silver for coloring glass has a particular importance, especially in connection with the coloring of bodies constituted by, or formed from, drawn soda lime flat glass. When the silver ions are reduced in the glass, or during the subsequent thermal treatment of the glass body, the glass takes on a yellow coloration. The yellow coloration is indicative of the fact that the body possesses certain actinic light absorbing properties. It is surprising to note that the process according to the invention permits the attainment of a significant yellow coloration, and that, by this fact, a significant actinic light absorption power is imparted to a body constituted by drawn soda lime glass of ordinary composition. Moreover, this is achieved under profitable conditions on an industrial scale by utilizing a treatment medium which contains a relatively small quantity of silver.

In certain processes according to the invention, the treatment medium contains less than 3 percent, by weight, of the salt or salts furnishing such reducible metal ions, these being silver ions. In such processes, the treatment medium can be very inexpensive. The presence of a minimal proportion of silver does not prevent the process from imparting a substantial yellow coloration to a body constituted by, or formed from, ordinary drawn soda lime flat glass. In fact, such a result can be achieved even when the proportion of silver salt in the treatment medium is far less than this value.

In certain embodiments of the process according to the present invention which can be utilized for treating ordinary drawn soda lime glass, also known as window glass, or float glass, the treatment medium contains less than 0.5 percent, by weight, of the salt or salts furnishing such reducible metal ions, this being a silver salt or salts. In certain other optimal processes according to the invention, in which float glass is treated, the treatment medium contains less than 0.05 percent, for example 0.01 percent, of a salt or salts furnishing the reducible metallic ions, this being one or more silver salts. Since the operation of diffusing the coloring substance into the glass is not itself being relied on to give the glass its final coloration, in view of the fact that the coloration is developed during a subsequent step, the diffusion of reducible ions into the float glass can take place during the continuous float glass fabrication process, despite the relatively high speed of advance of the glass ribbon and without it being necessary to take any special measures to improve the rate of diffusion of the reducible metal ions into the glass.

While emphasis has been placed on silver as the particularly desirable coloring substance, the present invention is not limited to processes in which this particular substance is utilized.

In certain processes according to the invention, the reducible metal ions present in the treatment medium are entirely, or in major part, copper ions. Use of copper is advantageous for giving strong colorations to glass bodies. The coloration thus achieved is useful, for example, for decorative purposes.

The invention can also be practiced utilizing gold as the substance for coloring a glass body.

Preferably, the treatment medium which contains a mixture of salt is in a molten state. The utilization of a medium in the molten state is desired for obtaining a very satisfactory diffusion of reducible ions into the glass body at normal atmospheric pressure. However, the invention can also be carried out using a treatment medium in which the mixture of metal salts is present in a vapor state.

The molten medium can be sprinkled or sprayed onto the body. However, it is preferred to immerse the body in the molten medium. Immersion is preferred because it generally permits the surface being treated to be maintained more easily at a uniform temperature.

Furthermore, the immersion technique is particularly preferred when the entire surface of the body is to be colored or subjected to a color modification. However, the invention is obviously not limited to processes in which the entire surface of the body is colored or subjected to a color modification. The invention also includes processes in which only a part of the body surface is colored, for example one face of a body having the form of a flat or curved sheet. If it is desired to color, or modify the color of, only one part of a surface, the body can be immersed in the treatment medium after the remainder of the surface of the body has been masked, for example with a temporary layer or coating.

In a modified embodiment of the process, only the part of the body which is to be treated can be immersed, provided that the form of the body permits. As another modification of the process according to the invention, the medium can be maintained in contact with the part of the surface to be treated by restricting such medium with a closed wall which contacts the body along the boundary of that portion of the surface which is to be treated. According to another modification, the medium can be caused to flow along the surface to be colored. The flow technique can also be utilized when it is desired to color, or modify the color of, the entire surface of the body.

When the diffusion treatment is carried out by maintaining a certain quantity of the treatment medium in a molten state in contact with the body to be colored, the uniformity of the treatment can be promoted by maintaining the medium in movement, for example by means of agitators. Alternatively, the medium can be agitated by injecting gas into it.

During the diffusion of the reducible metallic ions into the body from a medium in a molten state, the required concentration of the reducible metallic ions can be maintained by electrolytic dissolution of a certain quantity of a solid or liquid substance providing the necessary ions.

Advantageously, the medium utilized for the first step of the treatment includes one or several zinc salts. It has been noted that the presence of one or several zinc salts in the treatment medium can aid the diffusion of given reducible metallic ions into the surface of a body of glass under given conditions. The addition of an appropriate zinc salt to a medium containing a copper salt permits the achievement of a darker tint and enables the attainment of tints extending to green or even to gray.

Advantageously, the reducible ions are provided by a metal salt selected from the group consisting of nitrates, chlorides and sulfates. In general, these salts are easy to prepare, to manipulate and to utilize. In addition, these salts are in the molten state and do not decompose at the temperatures under consideration.

When the salt or salts furnishing the reducible metal ions are silver salts, the first step of the treatment, i.e., the step during which the reducible metal ions are caused to diffuse into the surface layers of the body, preferably takes place while the temperature of the body is less than 350°C. The maintenance of the temperature below this value contributes toward the goal of limiting the diffusion of reducible ions into the body during the first step of the process, preparatory to the controlled development of the color which takes place in the subsequent second step.

The second step of the process involves heating the body to a temperature above the strain point of the glass. According to preferred embodiments of the invention, in which the body is composed of, or formed from, drawn soda lime flat glass, the body is heated to a temperature of at least 500°C after the diffusion of reducible metal ions into such body. By heating the body to 500°C in the second step, it is possible to obtain useful coloration densities in moderate, or even very short, treatment times. This is true even when use is made of a treatment medium in which the reducible metal ions are silver ions and are present in a very small concentration in the treatment medium, for example a concentration of less than 0.5 percent, by weight.

During the performance of certain test processes according to the invention, it was noted that the quantity of reducible silver ions diffusing into the glass during the first step of the process had not been reduced, although a certain quantity of reducing ions remained available in the surface layers of the glass. The effect produced by heating during the second step of the process is probably an augmentation of the activity of the reducible and reducing ions in such a manner that the coloration, which can even be practically invisible at the end of the first process step, is developed. This does not signify that this is necessarily the actual and sole reason for the success of the process. Other phenomena, such as the development of crystallites, probably play a significant role.

Whatever the reason, it is a fact that significant colorations can be achieved by the combination of the two steps, even when utilizing in the first step a molten salt containing a comparatively small quantity of a salt of the coloring metal. When use is made of a silver salt furnishing silver ions which are caused to diffuse into float glass, the quantity of silver salt in the treatment medium can be very small. For example, the medium can contain only 0.01 percent of silver nitrate.

Depending on the concentration of silver ions in the treatment medium and/or the influence of other factors such as the presence or absence of an adjuvant and possibly a zinc salt, it is possible to obtain satisfactory colorations which are suitable in the field of actinic light protection while employing treatment times of between, for example, 4 hours and several minutes and while employing treatment temperatures of 500°–600°C during the second step of the treatment.

The development of the coloration during the second step of the process can be aided by placing the treated surface of the body, during at least one part of the second treatment step, in contact with a reducing fluid, for example a reducing gas such as hydrogen. This operation is of particular interest when the coloring substance is copper.

The salt with which the salt furnishing the reducible metal ions is mixed so as to constitute the treatment medium can also perform the additional role of a diluting agent for the coloring substance salt. For example, the diluting agent can contain a metal salt furnishing metal ions which diffuse into the glass body in exchange for other ions to impart some other modification to its surface properties.

In certain processes according to the invention, after the heating of the glass body to give it the final coloration, the body is rapidly cooled in order to produce surface compressive stresses therein. It is thus possible to easily effectuate the coloring and the tempering of the body during a single treatment process.

Other processes according to the invention involve the operation, during the heating of the body, when it is at a temperature above the strain point of the glass after the diffusion of the reducible metal ions in such a body, of diffusing into the surface layers of the body ions, for example lithium ions, which impart a reduced coefficient of thermal expansion to the surface layers, in exchange for other ions initially present in the glass, in such a manner as to induce surface compressive stresses when the body is subsequently cooled.

The body is thus chemically tempered and, as a result, presents an increased resistance to breakage when its surface is subjected to tension forces.

The body can also be tempered in another manner, either by a treatment which is carried out at least partially during the coloration treatment, or by a treatment which is carried out subsequent to the coloration treatment. Thus, the body can be thermally tempered by heating it and then cooling it rapidly after it has been cooled at the end of the second step of the coloration treatment according to the invention. As another example, after the coloration treatment is terminated, the body can be chemically tempered by diffusing ions into the body from a contacting medium in exchange for smaller ions, this taking place at a temperature which is sufficiently low to prevent complete relaxation of the surface compressive stresses in the glass.

In the ion exchange treatments of the type described above, it is preferably to utilize a medium containing, as the chemical tempering agent, an alkaline metal salt furnishing the cations which are caused to diffuse into the glass in exchange for other ions initially present in the glass. For example, it is very advantageous to utilize a molten potassium salt. The alkaline metal salts which are suitable in such a tempering treatment involving ion exchange can be selected, for example, from among nitrates, chlorides and sulphates.

Glass drawing apparatus and float glass apparatus which can be used in the practice of the present invention are disclosed e.g., in "Glass Machines," page 351 and pages 353–357 edited by W. Giegerich and W. Trier (Springer-Verlag 1969) and in the U.S. Pat. No. 3,509,011.

The process according to the invention can be employed not only for coloring initially colorless glass but also for modifying the color of a glass body which has already been given some coloration. When the process is applied to a previously colored glass body, it is carried out in exactly the same manner as for glass which is initially colorless. The modification of the coloration can result in a modification in the existing color, or tint, or can simply reinforce the existing color, or render the existing color, or tint, more intense, or darker. The existing color may have been produced by a previous treatment, which previous treatment could also have been carried out in accordance with the present invention.

When the second step of a process according to the invention is carried out at a sufficiently high temperature, for example above 600°C, it is possible, in certain cases, for example when the body is constituted by flat glass, to bend the body during this second treatment step. The execution of a bending operation during the coloration treatment is advantageous since it helps to accelerate the mass production of articles such as, for example, vehicle windshields. By carrying out a tempering treatment during the coloration process, it is possible to impart to a flat glass panel a yellow coloration, a tempering and a bending into a desired curvature, all in a relatively short period of time.

Processes according to the invention can be carried out for imparting different colorations to different parts of the surface of a glass body. Thus, by way of example, a body of flat glass can be subjected to processes according to the invention to confer different colorations to the surface layers of the opposed faces of the glass. For example, both faces could be given yellow coloration, but the density of the coloration on one face could be different from that on the other face.

The invention also includes a glass body which has been colored, or subjected to a color modification, by a process according to the invention.

In particular, the invention includes a vehicle windshield composed of two glass sheets, or at least one glass sheet and at least one plastic sheet, at least one glass sheet of the former or the glass sheet of the latter having been colored or subjected to a color modification on at least one of its faces by a process according to the invention. The two sheets of such a windshield are joined together along their edges or across their entire surface by an intervening layer of adhesive material. Advantageously, the intervening layer includes a preformed sheet, which may be polyvinylbutyral. Particular importance is attached to windshields composed of two such glass sheets, at least one of which has been colored or subjected to a coloration modification, these sheets being assembled together by means of a preformed intervening sheet, for example of polyvinylbutyral.

As has been pointed out above, the present invention is performed on glass bodies which contain reducing ions. Glass bodies which are to be treated according to the invention can be prepared to contain the necessary concentration of reducing ions according to any of the various specific techniques described in our copending application entitled "Production of Colored Glass Bodies," that application having been filed concurrently with the present application and claiming the priority rights of Luxembourg Application Ser. No. 63,992 of Oct. 1st, 1971.

DESCRIPTION OF THE PREFERRED EMBODIMENTS

While the basic processes according to the invention have been described above, a better appreciation of the nature and advantages of the invention will be provided by the several non-limitative Examples which will be set forth below.

Example 1

A ribbon of glass composed essentially of 72.5% $SiO_2$, 1.5% $Al_2O_3$, 14% $Na_2O$, 7.5% CaO, 4% MgO and small quantities of K₂O and iron oxide was drawn according to the Pittsburgh process. The ribbon had a thickness of 3mm.

Glass sheets measuring 1m × 0.5m and cut from such a ribbon were preheated and then immersed in a bath of molten salts composed of 58%, by weight, KNO₃ and 42%, by weight, NaNO₃ to which bath had been added 0.2%, by weight, AgNO₃.

The bath was brought to a temperature of 330°C and the immersion lasted for 1 hour. After withdrawal of the sheets from the bath, the sheets were still colorless.

Then, certain of these sheets were subjected to a thermal treatment at 550°C for 3 hours. The glass was then cooled and washed. These sheets had acquired a yellow coloration.

Other sheets which had been immersed in the bath were treated at 600°C for several minutes and then abruptly cooled and subsequently washed. The resulting coloration was yellow and, in addition, the abrupt cooling had for its effect to impart to the sheets a thermal tempering of its two faces, with the result that their resistance to breakage due to flexure was increased.

A third series of sheets which had been immersed in the bath was subjected to a thermal treatment at 650°C for a time necessary to permit the sheets to be bent. After cooling and washing, the resulting sheets were curved and yellow in color.

Example 2

Glass sheets identical with those employed in Example 1 were immersed in a bath of molten salts whose composition, by weight, was 2% AgNO₃, 41% NaNo₃ and 57% KNO₃. The temperature of the bath was 300°C and the duration of the immersion was 30 minutes.

These sheets were then subjected to a thermal treatment at a temperature of 550°C for 1 hour. The glass was then cooled and washed.

The resulting coloration was yellow while before the thermal treatment the glass remained colorless.

An identical treatment was carried out on other glass sheets in a bath of molten salts composed of 10% AgNO₃ and 90% NaNO₃. The sheets were then subjected to the same thermal treatment as that just described. In this case, the coloration obtained after the thermal treatment was an intense yellow.

Example 3

Glass sheets identical with those employed in Example 1 were immersed in a bath of molten sulphates whose composition, by weight, was: 10.5% CuSO₄, 32.2% NaSO₄, 47.6% ZnSO₄ and 9.7% K₂SO₄. After remaining for 20 minutes in this bath, which was maintained at 550°C, the glass acquired a very weak greenish tint.

The sheets were then subjected to a thermal treatment in a hydrogen-containing atmosphere at 650°C, this thermal treatment lasting for 10 minutes. It was observed that the color had been modified and became pink.

Example 4

In a first step of the process according to the invention, samples (a) of ordinary glass having a composition comparable to that of Example 1, (b) of a glass whose composition was 80% SiO₂, 2% Al₂O₃, 13% B₂O₃, 3.5% Na₂O, 1% K₂O and a small quantity of iron oxide, and (c) of athermanous glass which was colored green and included in its composition a larger quantity of iron oxide than is contained in ordinary glass, where all immersed in a bath of NaNo₃ containing 0.15%, by weight, AgNO₃ and maintained at 350°C. The immersion lasted for 2 hours. After removal from the bath, the three samples were cleaned and heated to a temperature of 600°C in a mold serving to give them a cylindrical form.

After these treatments, it was observed that samples (a) and (b), which had been colorless before the heat treatment, presented a yellow tint and had a light transmission of about 70 percent. On the other hand, sample (c) which had maintained its green tint after treatment in the molten salt bath, became dark brown after the heat treatment and exhibited a light absorption which was much greater than that of ordinary glass. The light transmission of sample (c) was, after heat treatment, of the order of 20 percent.

Example 5

A ribbon of glass having a thickness of 3mm was obtained by a float process. Such a ribbon contained, in its surface which had been in contact with the molten tin bath in the float tank, reducing tin ions.

While this ribbon passed through the annealing lehr of the float glass manufacturing apparatus, an aerosol of a mixture of molten salts at a temperature of 400°C was projected onto the lower face of the glass. This mixture had the following composition, by weight: 42% NaNO₃, 58% KNO₃ and 0.2% AgNO₃. This mixture remained in contact with the glass for several seconds.

After cooling, the glass, which remained colorless, was cut into sheets and subjected to a thermal treatment for 15 minutes at 500°C. After the heat treatment, the face of the sheets which had been in contact with the tin bath possessed a pale yellow coloration.

Example 6

Sheets of glass having the following composition, by weight: 71% SiO₂, 1% Al₂O₃, 14% Na₂O, 9% CaO, 4% MgO and small quantities of SO₃, Fe₂O₃ and K₂O, were fabricated by a float glass process. These sheets were immersed for 5 minutes in a mixture of molten salts maintained at 300°C. This mixture had the following composition, by weight: 58% KNO₃, 42% NaNO₃, and 0.2% AgNO₃.

After the sheets were removed from the bath, they were cooled and washed, and were found to remain colorless.

Different ones of the sheets were then subjected to respective ones of the three following thermal treatments:

500°C for 2 hours
500°C for 15 minutes
600°C for 20 seconds.

The resulting coloration was, in each case, an intense yellow and was localized at the surface which had been in contact with the molten tin bath in the float glass apparatus.

In a further test, the same operations were repeated with identical starting glass sheets, but with the difference that during the first step of the process the mixture of salts set forth was replaced by a mixture which differed in that it contained only 0.01 percent, by weight, of AgNO₃. After heat treatment, these sheets were also observed to have a yellow coloration, but the coloration was less intense than in the preceding test.

Example 7

Glass sheets identical with those utilized in Example 1 were immersed for 1 hour in a mixture of molten salts maintained at 300°C and composed of $NaNO_3$ and 0.2%, by weight, $AgNO_3$. After withdrawal from the bath, cooling and washing, the sheets were observed to remain colorless.

They were then subjected to a thermal treatment for 2 hours at 560°C. Thereafter, they were slowly cooled and were observed to have a yellow coloration.

A subsequent thermal treatment was then carried out in which these sheets were immersed in bath of $KNO_3$ at a temperature of 420°C for a period of 8 hours.

After cooling and washing, the coloration of the glass had not been changed, but the sheets had acquired a mechanical strengthening due to the diffusion therein of $K^+$ ions. The strengthening was identical in both faces of each sheet and the resistance to breakage due to flexure, expressed in terms of the maximum stress existing in that face of the sheet which was placed in tension by the flexure force, was of the order of 100 $kg/mm^2$.

Example 8

Glass sheets identical with those employed in Example 1 were immersed in a bath of molten salts composed of, by weight, 58% $KNO_3$ and 42% $NaNO_3$ and to which had been added 0.5% $AgNO_3$. The bath was maintained at a temperature of 330°C and the immersion lasted for 1 hour.

After the sheets were withdrawn from this first bath, they were observed to still be substantially colorless. They were then immersed in a second bath of molten salts composed of, by weight, 58% NaCl, 40% $NaNO_3$ and 2% $LiNO_3$, the bath being maintained at 580°C. The sheets remained in this bath for 2 hours. Then they were withdrawn from the bath, cooled and rinsed.

It was found that $Na^+$ ions initially present in the glass has been replaced by $Li^+$ ions coming from the molten salt, thereby imparting to the surface layers of the glass a coefficient of thermal expansion lower than that of the remainder of the glass. As a result, after cooling, the surface layers of the glass were in compression.

It was observed that during this immersion in the second bath, the glass had acquired a yellow coloration and that, in addition, its resistance to breakage due to flexure had been increased. The resistance to breakage of the resulting glass corresponded to a maximum stress in that face which had been placed in tension by the flexure force of the order of 97 $kg/mm^2$.

Those embodiments of the process involving bending of flat glass sheets can be carried out in the apparatus disclosed in U.S. Pat. No. 3,626,723, although the temperature conditions mentioned in that patent need not be maintained.

It will be observed that the above description of the present invention is susceptible to various modifications, changes and adaptations, and the same are intended to be comprehended within the meaning and range of equivalents of the appended claims.

We claim:

1. A process for imparting a yellow coloration to soda-lime-silica glass bodies of ordinary composition containing a small concentration of reducing ions in at least the surface layers of a portion thereof and having no visible coloration, comprising the steps of:

placing the surface of such a body which is associated with such surface layers in contact with a contacting medium composed of a mixture of molten metal salts, which mixture includes a silver salt present in a concentration of between 0.01 percent and 3 percent, by weight, and furnishing reducible silver ions capable of being reduced by the reducing ions in the surface layers in such a manner as to impart a yellow coloration to the body; said placing being under concentration, temperature and time conditions such as to cause such reducible ions to diffuse into such body surface layers without giving a significant visible coloration to the glass; and subsequent to such diffusion, heating such body to a temperature above the strain point of the glass and higher than the temperature employed during said step of placing for a time sufficient to cause the body to develop a yellow coloration.

2. A process as defined in claim 1 wherein the medium contains less than 0.05 percent, by weight, of silver ion furnishing salt.

3. A process as defined in claim 1 wherein the medium contains less than 0.5 percent, by weight, of silver ion furnishing salt.

4. A process as defined in claim 1 wherein the medium additionally contains a zinc salt.

5. A process as defined in claim 1 wherein the salt furnishing reducible metal ions is a nitrate, chloride, or sulphate.

6. A process as defined in claim 1 wherein said step of maintaining is carried out in such a manner as to maintain the temperature at a value below 350°C.

7. A process as defined in claim 1 wherein the body is formed of drawn soda lime flat glass and said step of heating is carried out so as to heat the glass to a temperature of at least 500°C.

8. A method as defined in claim 1 further comprising, after said step of heating, rapidly cooling the body to induce compressive stresses in its surface layers.

9. A process as defined in claim 1 further comprising, during said heating step and while the body is at a temperature above the strain point of the glass, diffusing into the surface layers of the body further ions which reduce the coefficient of thermal expansion of the body, in exchange for other ions, and subsequently cooling the body to induce compressive stresses in the surface layers thereof.

10. A process as defined in claim 1 further comprising, during said heating step and while the temperature of the body is above the strain point of the glass, bending the body.

11. A glass body provided with a desired coloration by the method as defined in claim 1.

* * * * *